United States Patent
Fujimoto

[11] 3,880,510
[45] *Apr. 29, 1975

[54] METHOD AND APPARATUS FOR INFORMATION RETRIEVAL

[75] Inventor: Sakae Fujimoto, Tokyo, Japan

[73] Assignee: Kabushiki Kaisha Ricoh, Tokyo, Japan

[*] Notice: The portion of the term of this patent subsequent to May 1, 1990, has been disclaimed.

[22] Filed: Oct. 27, 1972

[21] Appl. No.: 301,273

Related U.S. Application Data

[63] Continuation-in-part of Ser. No. 12,089, Feb. 17, 1970, Pat. No. 3,730,619.

[52] U.S. Cl. ................................ 353/26; 353/78
[51] Int. Cl. .................... G03b 23/12; G03b 21/28
[58] Field of Search ......................... 353/25–27, 353/85; 226/33; 250/219 D, 219 F

[56] References Cited
UNITED STATES PATENTS

| 3,110,217 | 11/1963 | Millner | 353/85 |
| 3,273,450 | 9/1966 | Ede | 353/26 |
| 3,322,961 | 5/1967 | Harrison | 250/219 |
| 3,528,735 | 9/1970 | Bluitt | 353/27 |
| 3,700,320 | 10/1972 | Brewer | 353/26 |
| 3,700,321 | 10/1972 | Peters | 353/26 |
| 3,730,619 | 5/1973 | Fujimoto | 353/26 |

FOREIGN PATENTS OR APPLICATIONS

| 703,472 | 2/1954 | United Kingdom | 353/26 |

*Primary Examiner*—Richard E. Aegerter
*Assistant Examiner*—A. J. Mirabito

[57] ABSTRACT

A method and apparatus for information retrieval wherein an endless film recording informations thereupon is advanced and the counting is started upon detection of the zero (reference) position of said film and when the counting reaches a predetermined value, the film is automatically stopped.

12 Claims, 14 Drawing Figures

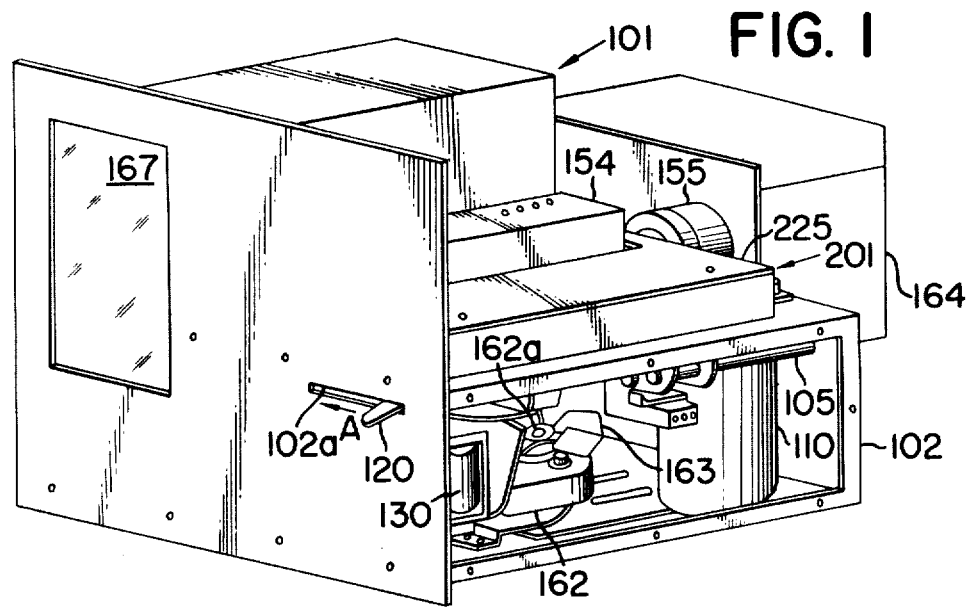
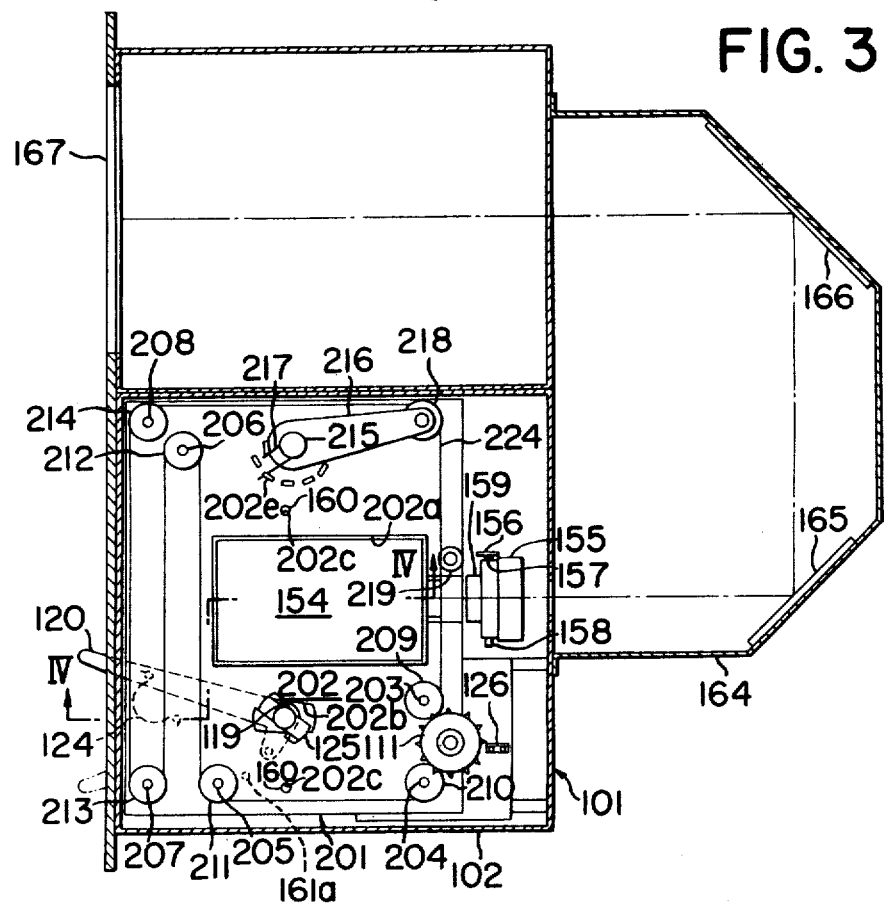

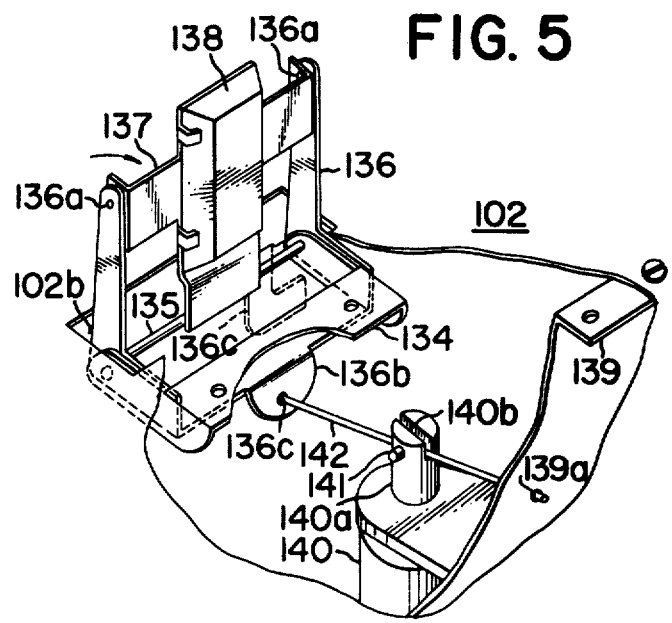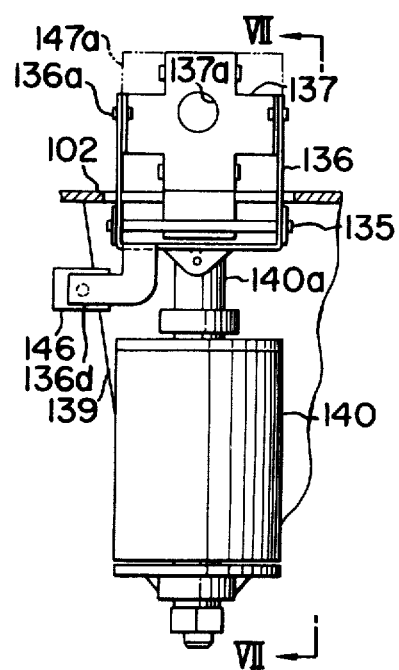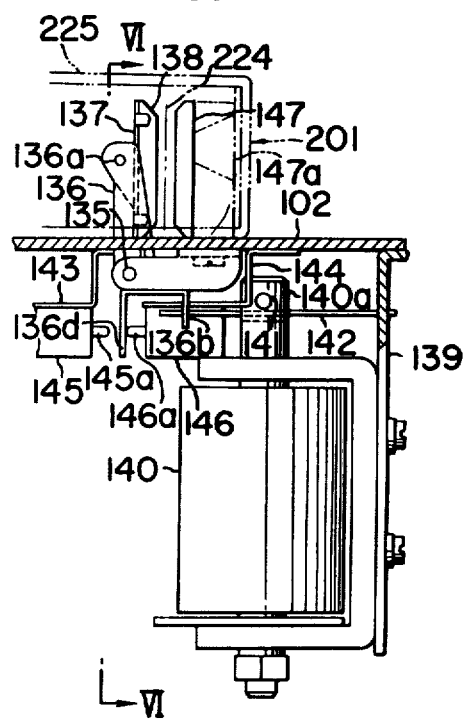

METHOD AND APPARATUS FOR INFORMATION RETRIEVAL

This application is a continuation-in-part of application Ser. No. 12,089 filed Feb. 17, 1970 now U.S. Pat. No. 3,730,619, issued May 1, 1973, for Method and Apparatus for Information Retrieval.

BACKGROUND OF THE INVENTION

The present invention relates to an information retrieval system and more particularly a system for retrieving a desired information recorded upon the tape.

Microfilming has long been widely used for recording on reduced scale of documents, printed matter and the like. In reading, optical enlargement is made from selected frames of the microfilm, but it is very slow and tedious to retrieve a desired frame for reading. To overcome this difficulty, there has been proposed an automatic mircrofilm retrieving system, but it is complicated in construction, very expensive in cost and unreliable in operation.

SUMMARY OF THE INVENTION

The present invention provides a method and apparatus for retrieving a desired information from microfilm in which an endless film recording information thereupon is advanced and the counting is started upon detection of the zero (reference) point of the endless film so that when the counting reaches a predetermined value, the film is automatically stopped for reviewing.

The information retrieval system in accordance with the present invention generally comprises a cartridge enclosing therein an endless film recording a multiplicity of informations thereupon and a main body of the retrieval system for retrieving a desired information from the film.

The main body is provided with means for detachably mounting the cartridge thereupon. Upon mounting of the cartridge on the main body, a power source main switch is automatically closed while the main switch is automatically opened when the cartridge is detached from the main body so that the main switch serves as safety means. A sprocket wheel on the side of the main body is advanced into the cartridge when the latter is mounted on the main body for advancing the film. At the same time, a pin which has been holding the zero (reference) position of the film is released so that the advancement of the film is permitted. Upon depression of an information retrieval button or switch, the film is advanced irrespective of the position at which the film has been held stationary and the counting is started when the zero (reference) position of the film is detected. When the counting reaches a predetermined value, the film is automatically stopped.

The novel features and advantages which are characteristic of the present invention are as follows:

By an instruction from a control unit, a desired film frame may be selected in a simple manner. The zero (reference) position detecting means is provided in both of the film and the main body of the system and it is not necessary at all to return the reference position of the film to a predetermined position when a desired information or film frame is retrieved since the zero (reference) position of the film is automatically detected and the desired film frame is automatically detected from the zero (reference) position by a driving system. Thus, it is readily seen that the erratic retrieval can be completely eliminated. A film pressure plate is so arranged as to retract from the film when the latter is being advanced so that the film has no flaws or scratches due to the friction between the pressure plate and the film. Furthermore, a light source is so arranged as to be turned on in response to the actuation of the pressure plate, so that only when the film is stopped the light source is turned on thereby preventing the overheat of the system. A circuit for advancing the film is opened when the pressure plate is pressing the film so that any erratic operation can be advantageously prevented. In the cartridge, the film is advanced along a curved path so that a considerable length of film having a multiplicity of informations can be stored in a cartridge compact in size. An operating lever for mounting and detaching the cartridge is so arranged as to be actuated only when the pressure plate is moved away from the film and the light source is turned off, so that the detachment of the cartridge when the film is at its projection position can be prevented. Furthermore, upon detachment of the cartridge, the film and the sprocket wheel are held at their zero (reference) position so that their zero (reference) positions may be always maintained in coincidence with each other. All of the circuits of the system are opened and closed upon detachment and mounting of the cartridge respectively, so that the provision of an independent switch for these circuits is not necessary. The cartridge is provided with an opening through which is inserted a light projection system so that the optical path design becomes simple and no waste of the light occurs due to the changes in direction of the optical path. A light source, a reflecting mirror and a screen are assembled into a unitary construction so that the system itself can be made compact and it is not necessary to provide a projection screen as an auxiliary equipment. A projection lens system is provided with a tilting means so that the adjustment in the vertical and horizontal directions of the projected image may be accomplished in a simple manner. Condenser lenses, a reflecting mirror, heat resisting glass are held in position by means of openings formed through the main body and only one lens holding plate is provided in a simple yet very positive manner so that the system can be made compact in size, light in weight and inexpensive to manufacture. The electric circuit of the system is such that the counting is started immediately when the zero (reference) position of the endless film is detected so that when the counting reaches a predetermined value, the stepwise rotation of the pulse motor is stopped. Therefore, the most reliable operation is ensured even though the construction is simple and the erratic operation or retrieval can be completely eliminated.

The above and other objects, features and advantages of the present invention will become more apparent from the following description of one illustrative embodiment thereof taken in conjunction with the accompanying drawing.

BRIEF DESCRIPTION OF THE DRAWING

FIG. 1 is a perspective view of an information retrieval system in accordance with the present invention illustrating the mounting of a cartridge;

FIG. 3 is a plan view of the system with the outer casing removed illustrating the image projection path;

FIG. 5 is a fragmentary perspective view illustrating a film pressure plate actuating mechanism;

FIG. 6 is a sectional view taken along the line VI—VI of FIG. 7 illustrating the rear view thereof;

FIG. 7 is a sectional view taken along the line VII-–VII of FIG. 6;

DESCRIPTION OF THE PREFERRED EMBODIMENT

Figure 2:
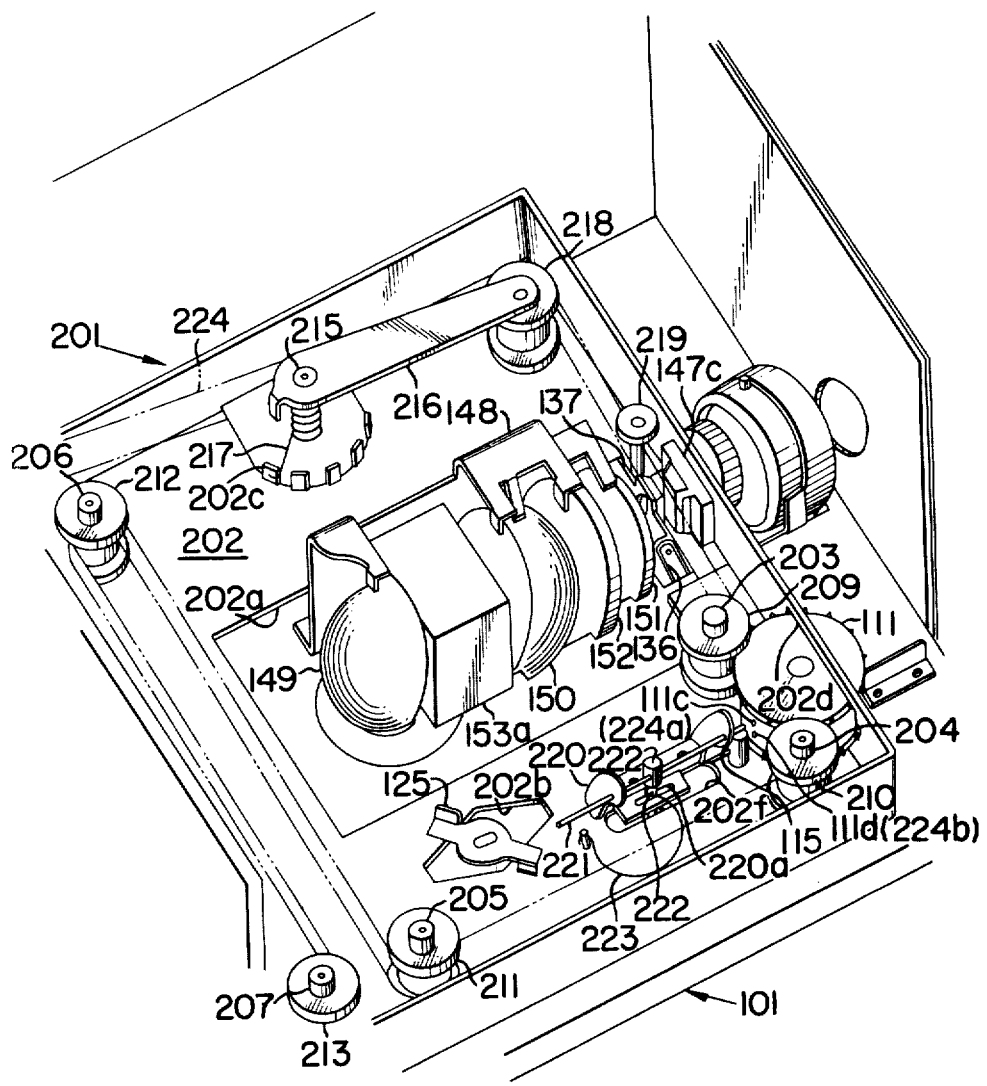
FIG. 2 is a perspective view illustrating the inside of the cartridge mounted with the cover thereof removed.
Figure 8:
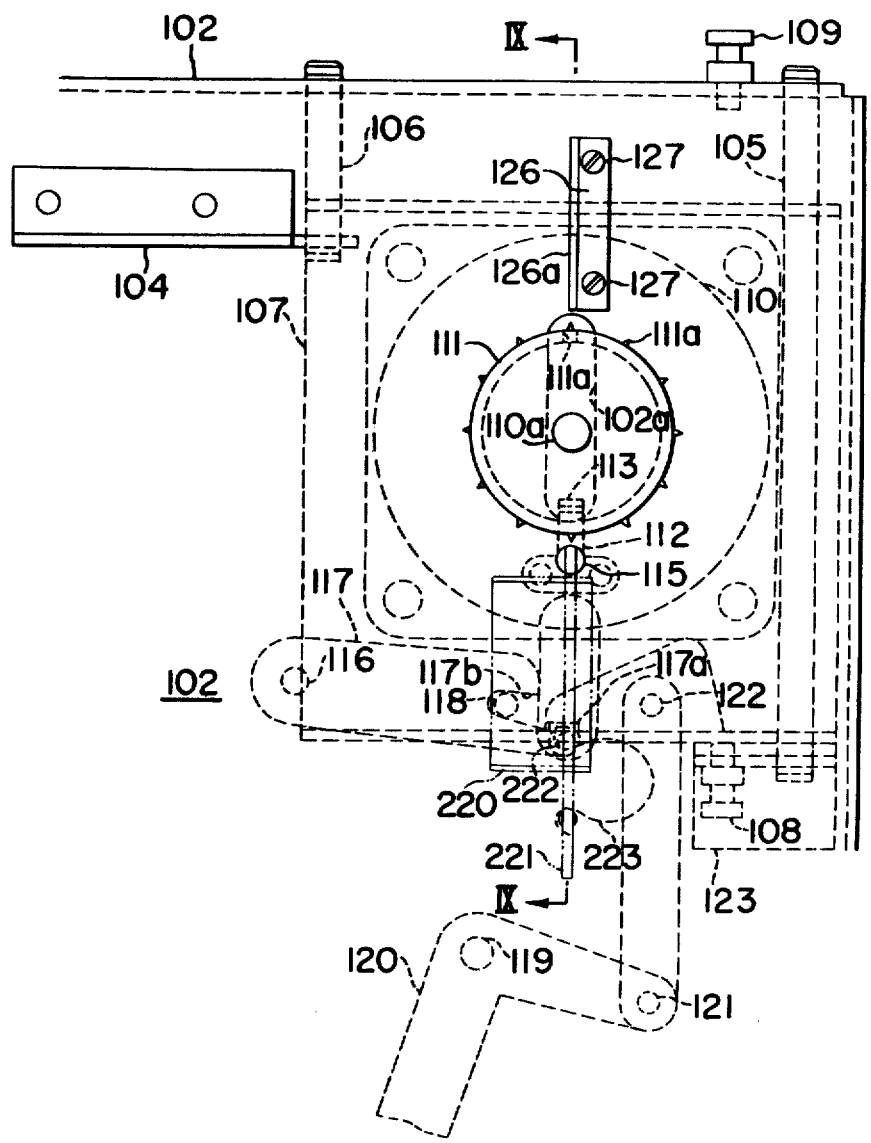
FIG. 8 is a plan view illustrating a sprocket wheel displacing mechanism.
Figure 9:
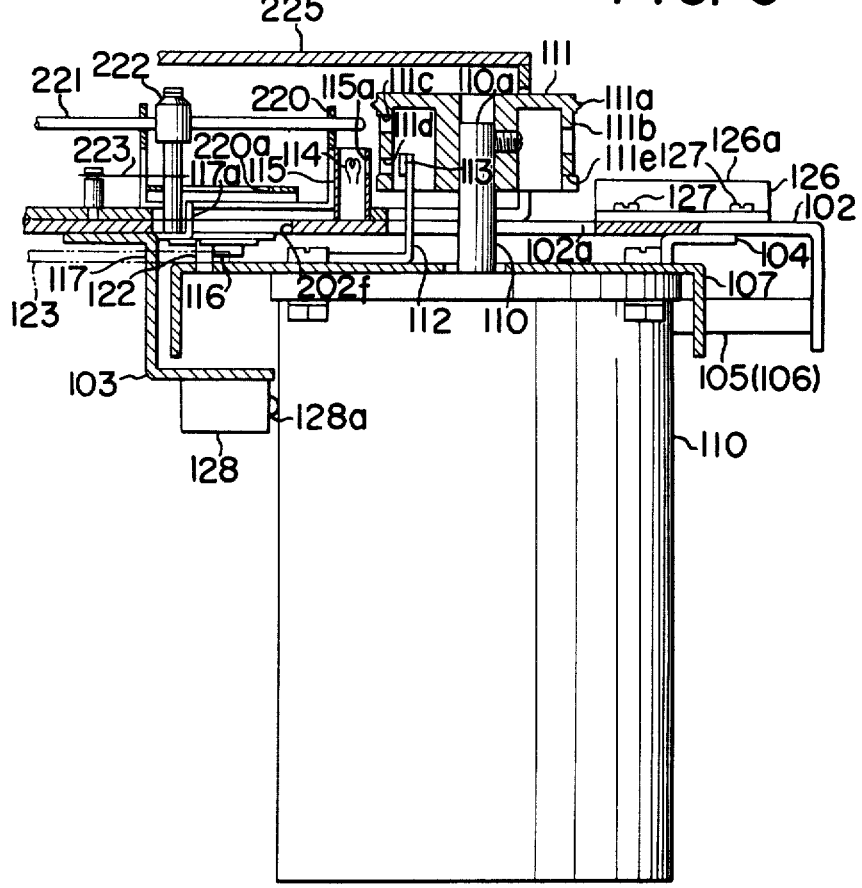
FIG. 9 is a side view partially in section taken along the line IX—IX of FIG. 8.

Referring to FIGS. 2, 8 and 9, guide rods 105 and 106 are disposed between the rear wall of a casing 102 of a main body 101 and brackets 103 and 104 securely fixed to the casing 102 respectively. A sprocket wheel retaining plate 107 is slidably carried by the guide rods 105 and 106 and stoppers 108 and 109 are disposed so as to limit the slidable movement of the sprocket wheel retaining plate 107. A pulse motor 110 is disposed downwardly of the plate 107 and the rotary shaft 110a of the pulse motor 110 is extended through an upper elongated slot 102a formed through the casing 102. A sprocket wheel 111 is securely fixed to the upper end of the shaft 110a and is provided with teeth 111a formed integrally therewith. Openings 111c and 111d are formed through the outer wall 111b of the sprocket wheel 111 and a groove 111e is formed along the lower side edge of the outer wall 111b. One end of a photosensitive element retaining arm 112 is securely fixed to the sprocket wheel retaining plate 107 and a photosensitive element 113 such as CdS is fixed to the upper end of the arm 112. A zero-position detecting lamp 114 is enclosed in a lamp housing 115 disposed upon the casing 102 and the light emitted from the zero-position detecting lamp 114 is intercepted by the photoconductive element 113 through an opening 115a formed through the lamp house 115 and the opening 111d formed through sprocket wheel 111.

An actuating lever 117 is pivotably fixed to the casing 102 by means of a pin 116 and is provided with a bent portion 117a formed at the leading end of the lever 117. A pin 118 extending from the sprocket wheel retaining plate 107 is fitted loosely into the bifurcated portion 117b of the actuating lever 117. An operating lever 120 is pivotably fixed to the casing 102 by means of a pin 119 and the leading end of the operating lever 120 extends outwardly through an opening 102a of the casing 102 as shown in FIG. 1. The other end of the operating lever 120 is connected by means of a pin 121 to a connecting lever 123 whose other end is fixed to the retaining plate 107 through a pin 122 extending therefrom. As shown in FIG. 3, a spring 124 is loaded between the casing and the operating lever 120 and a cartridge retaining member 125 (See FIG. 3 is fixed integrally to the operating lever 120.

A sprocket wheel engaging plate 126 is fixed to the casing 102 by means of screws 127 so that when the groove 111e of the sprocket wheel 111 engages with the uprightly bent portion 126a of the engaging plate 126 upon displacement of the sprocket wheel 111, the rotation thereof can be prevented. A micro-switch 128 is fixed to the bracket 103 in such a manner that the actuating member 128a of the micro-switch 128 may make contact with the side surface of the pulse motor 110. The microswitch 128 is turned on only when the sprocket wheel 111 is in its film driving position so that the pulse motor 110 is energized.

Figure 4:
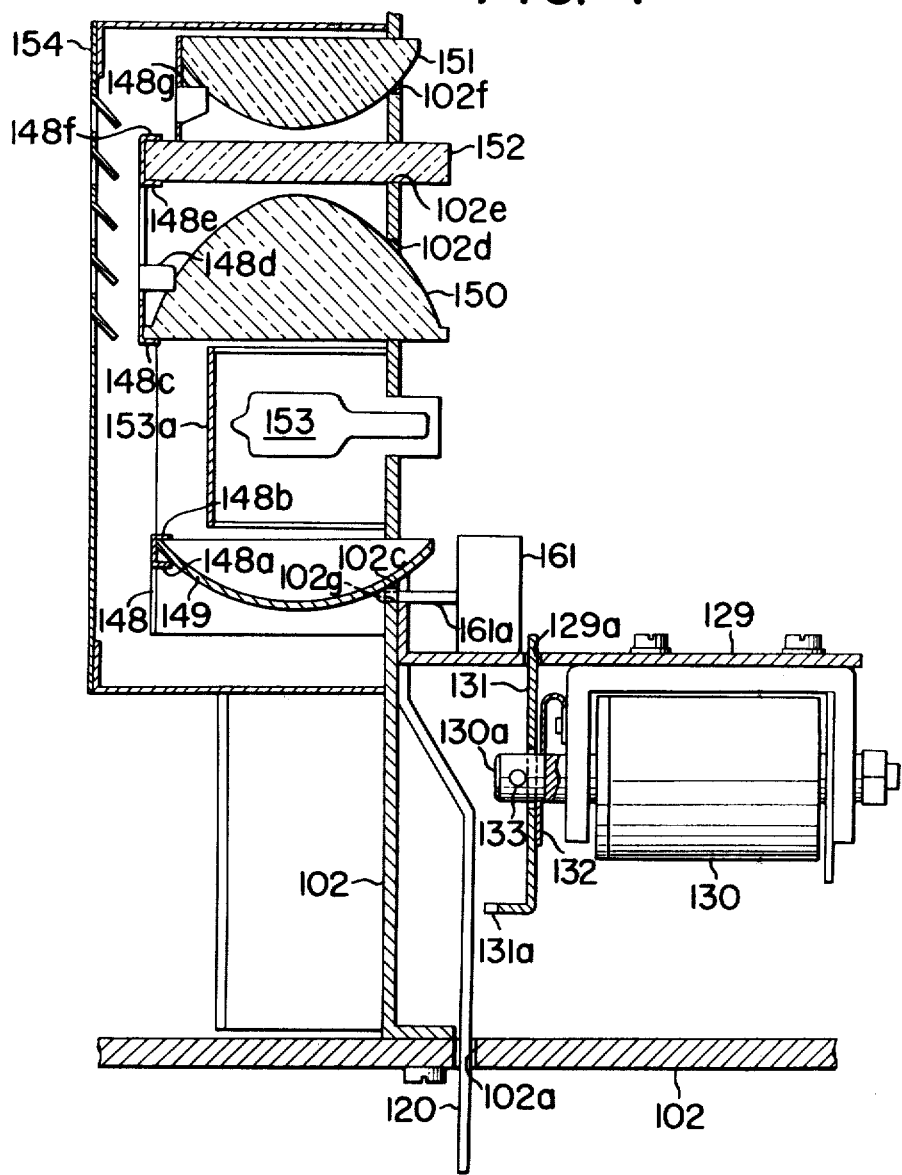
FIG. 4 is a sectional view partially in section taken along the line IV–IV of FIG. 3 illustrating a light source section and a cartridge mounting safeguarding mechanism.

As shown in FIG. 4, a bracket 129 is fixed to the casing 102 and a solenoid 130 is securely fixed to the bracket 129. Between an engaging member 131 adapted to rotate about an opening 129a of the bracket 129 and the stationary member of the solenoid 130 is interposed a spring 132. The bent portion 131a at a leading end of the engaging plate 131 is adapted to engage with a side surface of the actuating lever 120 while one surface of the engaging plate 131 is engagable with a pin 133 extending from the plunger 130a of the solenoid 130 so that the rotation of the engaging plate 131 is limited. Only when the photosensitive element 113 intercepts the light from the zero-position detecting lamp 114 through the opening 111d of the sprocket wheel 111 is the solenoid 130 energized so that the engaging plate 131 is retracted from the passage of the operating lever 120.

As shown in FIGS. 5, 6 and 7, a bearing plate 134 is securely fixed to the casing 102 and an L-shaped lever 136 is rotatably carried at each end of a shaft 135 extending between spaced arms of the bearing plate 134. The arms of the L-shaped levers 136 are extended upwardly through an opening 102b of the casing 102 and a pressure plate retaining member 137 is rotatably interposed between the arms through pins 136a. An opening 137a is formed through the retaining member 137 and a pressure plate 138 made of a transparent material such as a transparent glass is attached to the member 137.

Another solenoid 140 is securely fixed to a bracket 139 which in turn is fixed to the casing 102. A groove 140b is formed in a plunger 140a of the solenoid 140. A spring 142 is interposed between the bottom of the groove 141b and a pin 141 extending across the groove 140b and has its both ends loosely fitted into the opening 139a of the bracket 139 and into an opening 136c formed through a bent portion 136b of a connecting plate for the L-shaped levers 136. Micro-switches 145 and 146 are fixed in opposed relation with each other to the brackets 143 and 144 fixed to the casing 102 respectively. The actuating members 145a and 146a of the micro-switches 145 and 146 are directed toward both surfaces of a bent portion 136d extending from the connecting plate of the L-shaped levers 136 in such a manner that the bent portion 136d normally presses the actuating member 146a, thereby energizing the pulse motor 110. Upon energization of the solenoid 140, the bent portion 136d moves away from the actuating member 146a thereby de-energizing the pulse motor 110 while the bent portion 136d presses the actuating member 145a, thereby lighting a light source 153 (See FIG. 4).

A film holding plate 147 made of a transparent material such as a transparent glass is fixed to a film holding plate retaining member 147a fixed in opposed relation to the pressure plate 138 to the casing 102. When the film 224 is traveling, by means of a fixed guide shaft 219 (See FIG. 2) the film 224 is spaced apart from both of the film holding plate 147 and the pressure plate 138.

As shown in FIG. 4, a reflecting mirror 149, condenser lenses 150 and 151 and a heat resisting glass 152 are somewhat elastically held in position through an opening 102c and notches 102d, 102e and 102f of the casing 102 and bent portions 148a, 148b, 148c and 148d, 148e, 148f and 148g of a lens holding plate 148. The light source 153 is interposed between the reflecting mirror 149 and the condenser lens 150 and is enclosed by a cover 153a. All of the reflecting mirror 149, condenser lenses 50 and 151, the heat resisting glass 152 and the light source 153 are enclosed within a light source housing 154.

Figure 10:
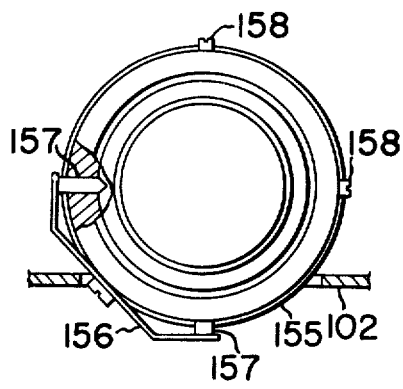
FIG. 10 is a plan view illustrating a tilting mechanism of a projection lens.
Figure 11:
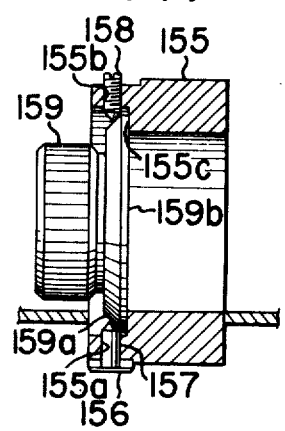
FIG. 11 is a longitudinal sectional view of the mechanism shown in FIG. 10.

A projection lens holding frame 155 is fixed to the film holding plate 147 on the upper side of the casing 102 in opposed relation with the light source 153 as shown in FIGS. 2, 10 and 11. A plate spring 156 has its intermediate portion fixed to the lens holding frame 155. Through bores 155a and tapped holes 155b are equiangularly formed through the side wall of the frame 155, and the through bores 155a are formed adjacent to the ends of the plate spring 156 respectively in spaced apart relation by 90° while the tapped holes 155b are formed in opposite location to the through bores 155a. Pins 157 each having a leading end tapered at an angle of 45° are loosely fitted into the through bores 155a and the plate spring 156 presses the head of each pin 157 inwardly. Screws 158 each having the leading end tapered at an angle of 45° are screwed into the holes 155b. A sloping surface 159a substantially at an angle of 45° is formed at the forward end of the lens barrel 159. An end fact 159b of lens barrel 159 is pressed against a stepped portion 155c of the lens holding frame 155 while the sloping surface 159a is in contact with the tapered leading ends of the screws 158 and the pins 157. Therefore, it is seen that by tightening or loosening the screws 158, the optical axis of the lens barrel 159 may be displaced in parallel direction.

Cartridge guide pins 160 extend from the upper side surface of the casing as shown in FIG. 3 and a main switch 161 is securely fixed to the bracket 129 (See FIG. 4) in such a manner that the actuating member 161a of the main switch 161 may extend upwardly through the opening 102g of the casing 102, whereby upon mounting of the cartridge upon the casing 102, the actuating member 161a is depressed so that all of the circuits of the system are energized.

As shown in FIG. 1, a cooling fan 163 is securely fixed to a rotary shaft 162a of a motor 162 mounted in the lower space of the casing 102. As shown in FIG. 3, a reflecting mirror housing 164 is integrally fixed to the casing 102 and has reflecting mirrors 165 and 166 fixed to the inner wall of the housing 164. At the front panel is disposed a projection screen 167 so that an image is projected thereupon by the light from the light source 153 through the condenser lenses 150 and 151, the heat resisting glass 152, the projection lens 159 and the reflecting mirrors 165 and 166.

As shown in FIGS. 2 and 3, an opening 202a into which is loosely fitted the light source cover 154, an opening 202b into which is fitted a retaining member 125 and openings 202c into which are fitted the guide pins 160 when the cartridge is mounted are formed through the bottom of the outer casing 202 of the cartridge 201. Through the rear side surface of the casing 202 is formed an opening 202d into which is loosely fitted the sprocket wheel 111. Guide rollers 209, 210, 211, 212, 213 and 214 are rotatably fixed to the bottom by means of pins 203, 204, 205, 206, 207 and 208 respectively. A roller supporting lever 216 is pivotably fixed by means of a pin 215 and a spring 217 is loaded between an upright portion 202e of the outer casing 202 and the pin 215. Any one of the plurality of upright portions 202e may be selected so that the force causing the roller lever 216 to rotate in the counterclockwise direction may be adjusted. At the free end of the roller lever 216 is rotatably fixed a tension roller 218. As shown in FIG. 2, the fixed guide shaft 219 is fixed to the bottom of the outer casing 202 and a bearing member 220 which is fixed to the surface of the outer casing 202 rotatably carries an engaging pin 221 having a depending pin 222 which extends downwardly through a guide hole 220a of the bearing member 220 and the opening 202f of the outer casing 202. A spring 223 is loaded between the pin 222 and the outer casing 202 so as to normally bias the engaging pin 221 toward the sprocket wheel 111 so that upon attachment of the cartridge 201 on the main body 101, the leading end of the engaging pin 221 is opposed to the opening 111c of the sprocket wheel 111 (See FIGS. 2 and 9). The endless film 224 is wrapped over the guide rollers 209, 210, 211, 212, 213 and 214 and the movable tension roller 218 as shown in FIG. 3. When the cartridge 201 is detached, the engaging pin 221 is fitted into a zero-position control opening 224a formed formed through the film 224 so that the advancement of the film 224 is stopped (See FIG. 2). An upper cover 225 is placed to cover the outer casing 202 (See FIG. 1).

Figure 12:
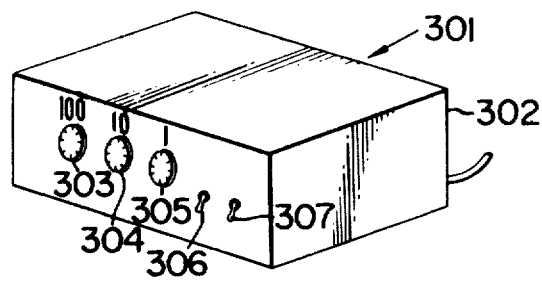
FIG. 12 is a perspective view of a control unit for transmitting an instruction for information retrieval.

As shown in FIG. 12, at the front panel of an instruction or control box 301 which gives instructions to the main body 101 are arranged setting knobs 303, 304, and 305 for setting a hundreds digit, a tens digit and a ones digit of a code number of a desired film frame a retrieval switch 306 and a light source switch 307.

Figure 13:
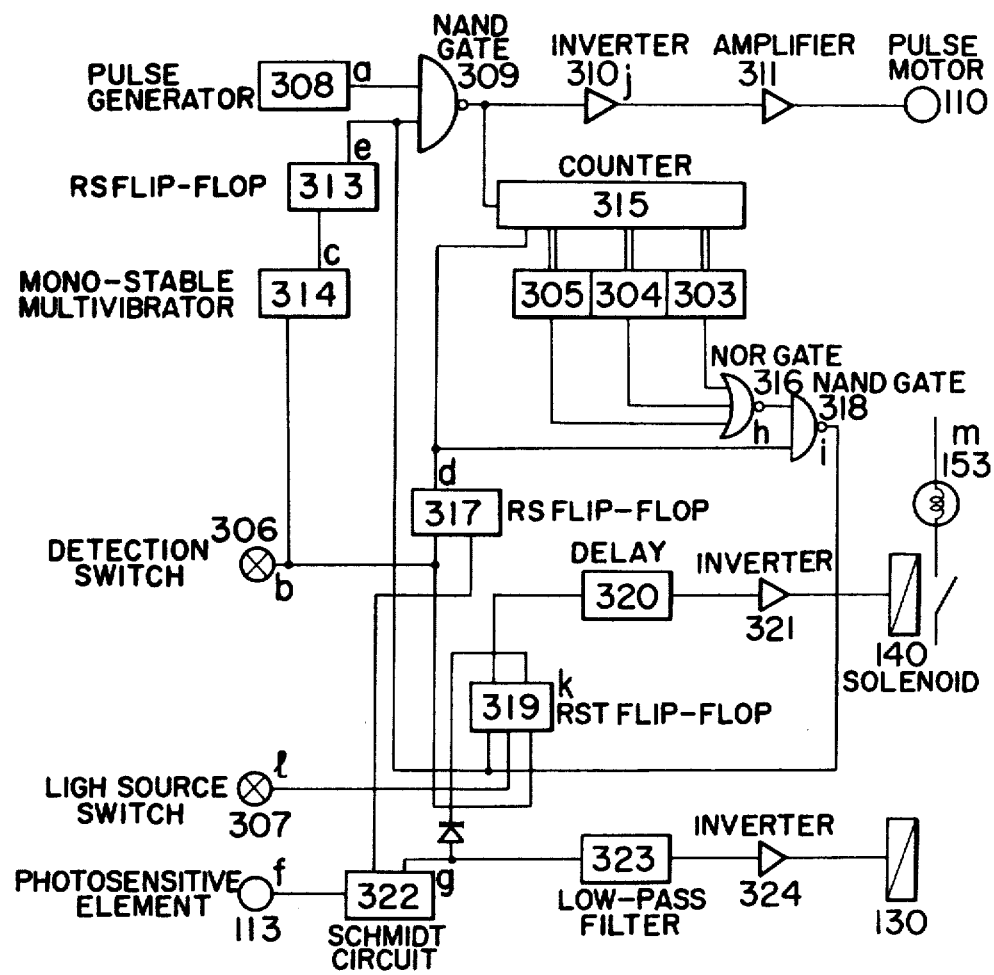
FIG. 13 is a block diagram of an electrical system of the information retrieval system in accordance with the present invention.
Figure 14:
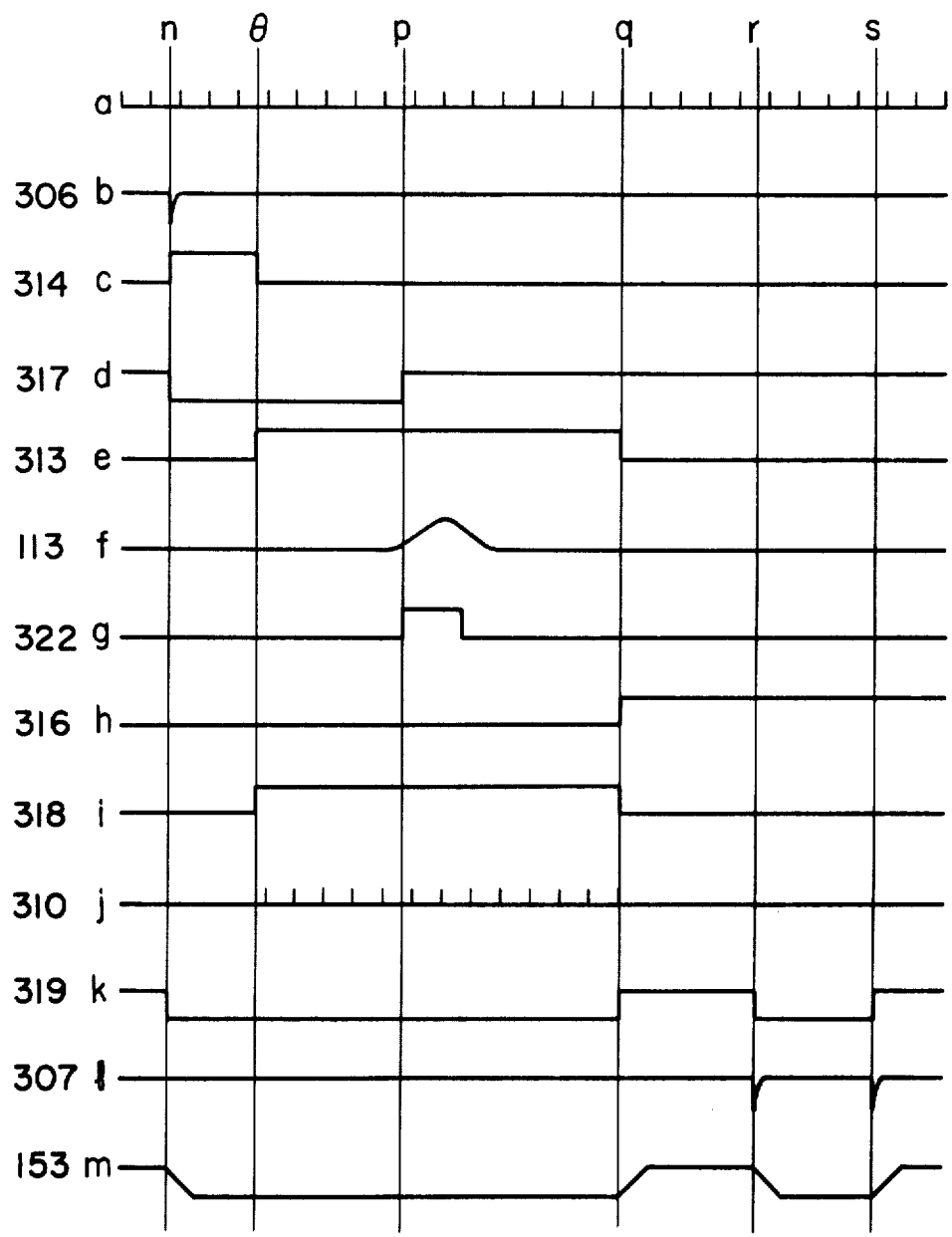
FIG. 14 is a graph for explanation of associated functions of various components of the system.

FIG. 13 is a block diagram of the electric circuit of the system and FIG. 14 is for explanation of the mode of operation thereof. Reference characters from $a$ to $m$ represent the outputs from various circuit components while reference characters from $m$ to $s$ represent the time at which the individual circuit component is operated.

In FIG. 14, a reference numeral $a$ represents an output from a pulse generator; $b$, an output from a detection switch 306; $c$, an output from a mono-stable multivibrator; $d$, an output from the output terminal of an RS flip-flop 317; $e$, an output from an RS flip-flop 313; $f$, an output from the photosensitive element 113 upon interception of the light from the zero-position detecting lamp 114; $g$, an output from a Schmidt trigger 322; $h$, an output from a three-input NOR gate 316; $i$, an output from a two-input NAND gate 318; $j$, an output pulse from NAND gate 309; $k$, an output from an RST fli-flop 319; $l$, an output from the light source switch 307; and $m$, ON and OFF of the light source and the actuation of the pressure plate 138. Reference numeral $n$ represents the time when the retrieval switch 306 is depressed; o, the trailing edge of the output pulse of the mono-stable multivibrator 314; p, the leading edge of the zero-position control opening 224a of the film; q, the completion of the counting by a counter 315; r, the depression of the switch 307 for turning off the light source; and s, the depression of the light source switch 307 for turning on the light source again.

Referring to FIGS. 12, 13 and 14 again, the mode of operation will be described hereinafter. When the power source switch is turned on, the pulses are always generated from the pulse generator 308. Next by the setting knobs 303, 304 and 305, the number of the information to be retrieved is set. Upon closing the retrieval switch 306, the film 224 starts to advance and at the same time a negative pulse is generated from the retrieval switch 306 so that the mono-stable multivibrator 314, RS flip-flop 317 and RST flip-flop RST 319 are triggered. After the retrieval switch 306 has been closed by the mono-stable multivibrator 314, and until the film pressure plate 138 is retracted, the actuation of the flip-flop 313 is delayed, but triggered at the trailing edge of the pulse from the mono-stable multivibrator 314. As long as the output from the flip-flop 313 is in the positive side, the two-input NAND gate 309 is opened so that the pulses from the pulse generator 308 are transmitted to the pulse motor 110 through the inverter 310 and an amplifier 311 so as to rotate the pulse motor 110 stepwise.

By the pulse transmitted from the NAND gate 309, the counter 315 is triggered. When the zero-position of the film is detected by the photosensitive element 113, the detecting signal wave form is shaped by the Schmidt circuit 322, thereby triggering the RS flip-flop 317. The output of the RS flip-flop 317 is transmitted to the counter 315, which starts the counting. The output of the RS flip-flop 317 is stored in the two-input NAND gate 318. When the content of the counter 315 reaches a predetermined level, the output voltage from the three-NOR gate 316 rises so that the output voltage of the NAND gate 318 fails. When the output voltage of the NAND gate 318 is decreased, the RS flip-flop 313 is reset while the RST flip-flop 319 is set. Therefore no pulse is derived from the two-input NAND gate so that the pulse motor is stopped. When the RST flip-flop 319 is set, the output therefrom is transmitted to the solenoid 140 through the delaying element 320 and the inverter 321, thereby energizing the same so as to displace the film pressure plate 138, whereby the film is held in stationary position. In response to the actuation of the pressure plate 138, the circuit of the light source for projection is closed. When the light source switch 307 is depressed, the light source is turned off, but upon depression of the switch 307, the light source is again turned on.

The light from the zero-position detecting lamp 114 passing through the opening 224b of the film 224 representing the starting position and the opening 111d of the sprocket wheel 111 is intercepted by the photosensitive element 113 (See FIGS. 2 and 9). The output from the photosensitive element 113 is reshaped by the Schmidt circuit 322. Reference numeral 323 designates a low-pass filter; and 324, an inverter. The low-pass filter 323 serves to prevent the energization of the solenoid 130 when the opening 224a of the film 224 passes only.

The arrangement and construction of the information retrieval system in accordance with the present invention have been described hereinafter. The cartridge 201 enclosing therein the endless film 224 having a plurality of information stored therein is mounted upon the casing 102 of the main body 101 with the sprocket wheel 111 being loosely fitted into the opening 202d of the outer casing 202 and the cartridge guide pins 160 being fitted into the openings 202c at the bottom of the cartridge 201 (See FIGS. 2 and 3). When the cartridge 201 is mounted upon the main body 101, the operating lever 120 is rotated in the direction indicated by the arrow A from the position illustrated in FIG. 1 so that the retaining member 125 presses the side edge of the opening 202b against the casing 102 as shown in FIG. 2. The bottom of the outer casing 202 of the cartridge 201 presses the actuating member 161a of the main switch 161 so that all of the electric circuits of the system are energized, thereby driving the cooling fan 163 (See FIGS. 1 and 3). Upon rotation of the operating lever 120 in the direction of the arrow A, the sprocket wheel retaining plate 107 is guided by the guide rods 105 and 106 so as to slide toward the left in FIG. 9 through the connecting rod 123, so that the upright portion 126a of the engaging lever 126 disengages from the groove 111e of the sprocket wheel 111 and the teeth 111a of the sprocket wheel 111 engage with the perforations of the film 224. At the same time, the pin 118 of the retaining plage 107 causes the actuating lever 117 to rotate in the clockwise direction so that the bent portion 117a of the lever 117 presses the connection pin 222, thereby causing the engaging pin 221 to rotate in the counterclockwise direction against the spring 223 (See FIGS. 8 and 9) so as to disengage from the opening 224a of the endless film 224, whereby the advancement of the film 224 becomes possible (See FIG. 2). In this case, the actuating member 128a of the micro-switch 128 is pressed against the side wall of the pulse motor 110, thereby energizing the motor 110 (See FIG. 9). In this condition, the zero-position detecting lamp 114, the openings 224b, 115a and 111d and the photosensitive element 113 are all aligned in collinear relation with each other so that the light from the lamp 114 is intercepted by the photosensitive element 113 (See FIGS. 2 and 9).

Next by the setting knobs 303, 304 and 305 of the instruction or control device 301, a desired film frame number is set and thereafter the retrieval switch 306 is turned on. Then as shown in FIG. 14, the negative pulse is generated so that the mono-stable multivibrator 314, the RS flip-flop 317 and the RST flip-flop 319 are triggered. The RS flip-flop 313 is triggered at the trailing edge of the pulse from the mono-stable multivibrator 314 so that the pulse motor 110 rotates stepwide (in the instant embodiment, the film is advanced one frame by two pulses). When the number counted from the zero-position of the film coincides with a present value, the pulse motor 110 is stopped so that the film 224 is also stopped. In this case, the solenoid 140 is energized and the plunger 140a extends downwardly so that the bent portion 136b of the L-shaped lever 136 is caused to move downwardly by the free end of the spring 142. Thus, the L-shaped lever 136 is caused to rotate in the clockwise direction (See FIG. 7) so that the pressure plate 138 presses the film 224 against the film holding plate 147.

In this case, the bent portion 136d of the L-shaped lever 136 presses the actuating member 145a of the micro-switch 145, thereby turning on the light source 153 whereby the information recorded on the film 224 is projected upon the screen 167 (See FIG. 3). To adjust the position of the projected image, the screws 158 of the projection lens holding frame 155 are loosened or tightened, thereby suitably displacing the lens barrel 159 without changing the distance from the plane of the film 224 by the screws 158 and the pins 157 under the force of the spring 156. After reading out the desired information, the light source switch 307 is depressed, the RST flip-flop 319 is reversed by the negative pulse as described hereinabove, thereby turning off the light source 153. If required, the light source switch 3007 is depressed again so that the flip-flop 319 is reversed again so that the light source 153 is turned on again (See FIG. 14). When the pressure plate 138 is pressing the film 224 against the plate 147, the microswitch 146 is opened so that no signal or pulse is transmitted to the pulse motor 110, whereby the film 224 will not be advanced even by an erratic operation.

When it is desired to have another information, the setting knobs 303, 304 and 305 are set to a desired film frame number and the retrieval switch 306 is depressed so that the solenoid 140 is de-energized as shown in FIG. 14 and the light source 153 is turned off. The plunger 140a is extended so that the L-shaped lever 136 is rotated in the counterclockwise direction through the spring 142. Therefore, the pulse motor 110 is driven stepwise and the film 224 is advanced. When the film 224 reaches the zero-position, the light from the zero-position detecting lamp 114 is intercepted by the photosensitive element 113, whereby the counter 315 starts counting. When the content of the counter 315 reaches a predetermined value, the pulse is not generated any longer so that the film 224 is stopped; the pressure plate 137 presses the film 224 against the film holding plate 147 and the light source 153 is turned on, thereby projecting the desired information upon the screen 167.

To remove the cartridge 201, the setting knobs of the instruction or control device 301 are set to zeros and the film 224 is returned to the zero-position by depressing the retrieval switch 306. In this condition, the zero-position detecting lamp 114, the film opening 224b, the openings 115a and 111d and the photosensitive element 113 are all aligned in a collinear relation with each other and the light source 153 is turned off when the solenoid 130 is energized (See FIG. 4). Upon energization of the solenoid 130, the engaging plate 131 is caused to rotate against the spring 132, thereby retracting from the passage of the operating lever 120 so that the latter is permitted to rotate. In this condition, the operating lever 120 is rotated in the direction opposite to the direction indicated by the arrow A so that the sprocket wheel retaining plate 107 is displaced and the groove 111c engages with the bent portion of the engaging lever 126, whereby the rotation of the engaging lever 117 is prevented. At the same time, the bent portion 117a of the actuating lever 117 is released from the connecting pin 222 so that the engaging pin 221 is caused to slide toward the right by the spring 223 and extends into the opening 224a of the film 224, whereby the advancement of the film 224 is prevented (See FIG. 2). In this case, the retaining member 125 is in coincidence with the opening 202b so that the cartridge 201 may be lifted and removed from the main body 101.

In the instant embodiment, the information retrieval has been described as being made by driving a drive wheel, that is the sprocket wheel 111 which in turn is driven by the pulse motor or the drive mechanism, but it will be understood that the present invention is not limited to the above described driving mechanism. For example, when a film having no perforation is used, the film may be provided with black or white marks representative of the individual informations, and the mark representative of the zero-position is made different from the above marks representative of the informations. The film driving device advances the film, and the instruction mark numbers from the zero-position are optically counted by the instruction from the control unit, thereby retrieving the desired information. The magnetic marks may be also used and magnetically detected. It is also within the scope of the present invention to rotate the sprocket wheel in proportion to a number of actuations of the solenoid of the driving mechanism by the pulses transmitted thereto from the control unit, thereby retrieving the desired information.

I claim:

1. Method for information retrieval comprising
locating a film having information thereon within a cartridge;
mounting said cartridge upon a main body;
providing a setting of a desired film frame;
electronically generating a periodic pulse signal independent of film motion;
energizing driving means with the electronically generated pulses for advancing the film by a predetermined amount in response to each independently electronically generated pulse, and actuating counting means to count each independently electronically generated pulse from a zero detecting location on the film;
comparing the count of the counting means with the setting and stopping the film driving means upon coincidence; and
deenergizing said driving means when the film is stopped.

2. Method according to claim 1 in which the film is pressed against a plate means when the film is stopped, and a light source is energized for projection.

3. Method according to claim 1 including providing a setting of a subsequent film frame, and driving the film to start a subsequent count from the zero position to again achieve coincidence for subsequent information retrieval.

4. An information retrieval system having a main body and comprising
a cartridge detachably mounted on said main body and having a film enclosed therein with a plurality of informations recorded thereon and a zero position;
means for engaging and advancing said film;
means for driving said advancing means;
means for setting information retrieval instruction;
means for detecting said zero position;
counting means for starting the counting immediately after said zero position has been detected;
means for stopping said driving mean when said counting means reaches the setting of said instruction;

means for projecting an information retrieval from the stopped film; and erratic operation preventive means for preventing the energization of said driving means when the film is stopped.

5. A system according to claim 4 in which said projection means includes additional means for selectively lighting a projection lamp when the film is stopped.

6. A system according to claim 5 in which means prevent actuation of said film advancing means when said projection lamp is lit.

7. A system according to claim 4 in which pressure plate means hold the film stationary when the film is stopped.

8. A system according to claim 4 in which electrical switch means is provided to actuate said advancing, counting and projecting means; and safety means energizes said switch means when said cartridge is mounted on said main body.

9. A system according to claim 4 in which said cartridge includes an opening to receive a light source section for projection, a plurality of guide rollers and a tension roller is provided in said cartridge, and the film is wrapped around said rollers to proceed along a nonlinear path.

10. A system according to claim 4 in which said cartridge includes an opening to receive said film advancing means in the form of a sprocket wheel.

11. A system according to claim 4 in which means is provided to maintain the zero position of the film when said cartridge is detached from said main body.

12. A system according to claim 11 in which said zero maintaining means comprises a pin that enters into a prdetermined hole in the film, said pin being retracted from said hole when said cartridge is mounted on said main body.

* * * * *